Patented July 20, 1954

2,684,379

UNITED STATES PATENT OFFICE 2,684,379

PROCESS FOR PRODUCING POLYSILOXANES

Clément Joseph Guillissen, Uccle-Brussels, and Abraham Gancberg, Froest-Brussels, Belgium, assignors to Union Chimique Belge, S. A., Brussels, Belgium, a corporation of Belgium No Drawing. Application December 20, 1949, Serial No. 134,122

Claims priority, application Belgium December 30, 1948

13 Claims. (Cl. 260—448.2)

This invention relates to a new process for the controlled production of polymerized silicon compounds. More particularly, it deals with a method of manufacturing substantially uniform polymers of organo-polysiloxanes in which at least two silicon atoms are connected by an oxygen atom in each polymer molecule.

Previously, organo-polysiloxanes have been formed by hydrolysis of halo- or organo-oxy-silicon compounds to produce corresponding silanols, which silanols were then condensed or polymerized, with the liberation of water, to produce the desired polysiloxanes. However, when a mixture of two or more different types of silanols thus produced were condensed, it was difficult if not impossible to obtain a uniform polymer structure, in that the different silanols reacted with themselves as well as with each other, because of the different speeds of condensation of of their different types of groups. As a result a mixture of different types of polymers was produced ranging from those containing mainly molecules of one of the reactants to those containing mainly molecules of the other reactant. Thus, the properties of the resulting product were largely a matter of chance, unpredictable, and far from uniform, and to obtain or control the production of any one type of polymer was practically impossible. For example, when diphenyl-silane-diol was condensed with itself a solid crystalline hexaphenyl-cyclotrisiloxane was obtained, which is not a resinous product as might have been expected from such a condensation (see Burkhard, J. Am. Chem. Soc. 67 (1945), 2173–4).

In a co-pending application of Guillissen and Gancberg, Ser. No. 49,124, filed September 13, 1948, a process was described for obtaining substantially uniform polysiloxanes by reacting an organo-halo-silane with an organo-oxy-silane, or organo-siloxane, but the reaction required an elevated temperature and preferably the presence of a catalyst.

It is an object of this invention to provide an improved method for producing organic polysiloxanes which method is simple, economic, effective, predictable and controllable.

Another object is to control the production of uniform organic polysiloxanes by reacting two or more different organosilanes at substantially atmospheric temperatures.

Another object is to control the production of uniform organic polysiloxanes from two or more different organo-silane reactants without the necessity of a catalyst, and even in some cases without an inert diluent, at least during the first major part of the reaction.

Another object is to produce a high yield of clear viscous liquid polysiloxanes which have a uniform molecular structure and substantially the same molecular weight, by reacting two different types of organo-silanes together without the production of undesirable by-products and polymers, including cyclopolysiloxanes.

Another object is to produce an organic polysiloxane directly from crude reactants, particularly silanol reactants, without isolating them as solids, thereby avoiding the losses and undesirable polymerization which occur during their isolation.

Another object is to produce an organic polysiloxane which has excellent coating properties, such as for the protection of metals, resists high temperatures, is flexible, and forms a glossy film.

In accordance with this invention, the substantially uniform organic polysiloxanes are produced by reacting one or more organo-halo-silane directly with one or more organo-hydroxy-silane, or organo-silanol, monomer or low molecular weight silanol polymer, to produce the desired uniform polymer and to liberate hydrogen halide. Since some organo-silanols polymerize very readily, it is important that only silanol monomers and polymers lower than pentamers be employed as reactants, which silanols are capable of being precipitated and isolated as relatively stable solid products. This stability is necessary in order to control their polymerization in the process of this invention and to obtain the desired uniform products.

The ratio of the organic radicals to the silicon atoms present in each reactant is at least one to one and may be as high as three to one (i. e. R/Si=1 to 3), which means any reactant may have directly connected to its silicon atom one, two or three organic radicals. The organic radicals are preferably selected from the groups of alkyl, aryl and alicyclic hydrocarbon radicals, and any one or both silane reactants may contain the same or different groups and/or number of carbon atoms, but preferably only between one and ten carbon atoms per radical.

All the halogen atoms are preferably the same in any given reaction mixture, and the halogen is preferably chlorine, although any one or more of the other halogens may be used.

The number of organo-silanol molecules need not be equal to the number of the organo-halo-silane molecules in the starting mixture of reactants, provided the number of halogen atoms present in said mixture are substantially equal to the number of hydroxy radicals, so that each halogen atom can react with a hydrogen of a hydroxy radical to produce hydrogen halide, and the resulting free valence bonds can join two silicon atoms together through an oxygen bridging atom from the hydroxy radical.

For example, in the case where di-alkyl (R')-dihalo (X)-silane is reacted with a di-aryl (R'')-silane-diol (i. e. R/Si=2 for each reactant), the following two reactions take place in the first steps of the polymerization process according to this invention:

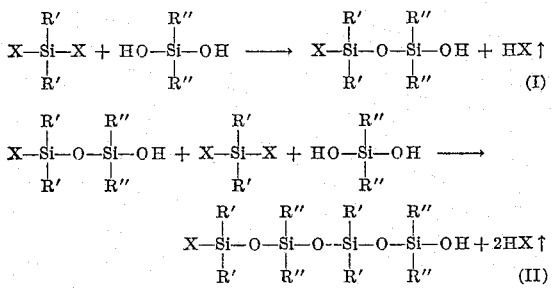

As can be seen from Equation II above the polymer is a uniform or regular chain product wherein the alkyl (R') and aryl (R'') radicals alternate uniformly on the silicon atoms along the chain, which silicon atoms are connected or bridged by oxygen atoms. In effect, the Equation II may take place in two parts, first reacting with the halo-silane reactant and then the resulting product reacting with the silanol, or vice versa.

The reaction according to this invention starts to take place as soon as the reactants are mixed together at atmospheric temperature and pressure without the addition of a catalyst or the application of heat. As the reaction continues the length of the polymer molecule increases. The employment of heat and/or a catalyst, such as a metallic halide catalyst as described in the co-pending application Ser. No. 49,124 mentioned above, materially increases the speed of the reaction and the polymerization, thus soon producing solid resinous polymers. Since it is preferred in this invention to produce viscous liquid polymers which may be used in varnishes and in or as similar liquid media, the conditions for carrying out the reaction are moderate, and the temperature of the reaction mixture is never carried above about 120° C. Preferably, the temperature is maintained below about 100° C. and the whole reaction is usually carried out between the temperatures of about 20° C. and 90° C., from the start to the finish. In certain cases, heat need be applied only at the end of the reaction to insure a quantitative reaction and to liberate any hydrogen halide which might be dissolved in the mixture.

In fact, to better control the reaction and prevent the reaction mixture from becoming too viscous, an inert and preferably anhydrous solvent, such as benzene, toluene, xylenes, ethyl ether, dioxane, or the like, or mixture of any two or more of such solvents, is often added at the start or later during the reaction, particularly if any heat is to be applied during the reaction. Since the exact temperature of operation depends on the properties of the reactants as well as the degree of polymerization and properties desired for the product, the employment of such a solvent permits the reaction mixture to be heated and/or refluxed at just the proper temperature to obtain the best desired results. However, in some cases it is advantageous to carry out the reaction without any solvent, i. e. just by mixing the two reactants, at least until the reaction has progressed to a point where the product is too viscous for the reaction to proceed, which only may occur after at least about four-fifths of the reactants have reacted. Then a small amount of a solvent may be added to reduce the viscosity of the mixture, and then also heat may be applied for a short time to complete the reaction and liberate any hydrogen halide which may remain dissolved in the viscous product.

The reactants which are monomers or low molecular weight polymers of organic silanes, may be produced by any known method and are readily available on the present market in sufficiently pure form to be employed directly in the process of this invention. For example, the organic halo-silane may be produced by reacting a silicon tetrahalide with a Grignard reagent, i. e. organic magnesium halide, preferably in the presence of a solvent and then from this, the silanol can be produced by hydrolysis, i. e. reaction with water, preferably at a low temperature to prevent polymerization of the product.

Since the organic silanol monomer or low molecular weight polymer reactant is delicate and difficult to purify, because during its isolation to a dry solid product it often polymerizes and much of the silanol is lost, the process of the invention can be applied immediately to the dried hydrolysis reaction product dissolved in an inert solvent solution. Thus, no loss or undesirable polymerization of the silanol has had time to occur and all that is formed from hydrolysis can be directly reacted with the organo-halo-silane or other reactant according to the process of this invention.

The final uniform organo-siloxane polymer produced by the process of this invention may be purified by washing and/or neutralizing the remaining small percentage of halide present therein and/or then filtering, and/or vacuum distilling to remove the solvent therefrom, which solvent is generally employed to reduce the viscosity of the final product, at least for the purpose of neutralization, washing or filtering. Since no catalyst is generally used, there is no problem involved for removing it from the reaction product.

The above mentioned and other features and objects of this invention and the manner of attaining them will become more apparent and the invention itself will be best understood by reference to the following specific examples of the process for the preparation of definite products having the above mentioned desired properties.

*Example I*

Into a two-liter, four-necked, round-bottomed flask there were introduced 65 grams of dimethyldichlorosilane which had been distilled between 68 and 72° C., the flask being fitted with a stirrer, a thermometer and a reflux condenser, and being connected with absorbers containing a known quantity of sodium hydroxide solution for absorption of the HCl to be produced. The dimethyldichlorosilane was diluted with 500 cc. of toluene and 100 cc. of ethyl ether, and 108 grams of solid diphenylsilane-diol were added. The latter dissolved slowly.

The reaction began at room temperature with the evolution of hydrogen chloride, and the flask was then progressively heated. At 60° C. the greater part of the hydrogen chloride corresponding to the chlorine in the dimethyldichlorosilane had been eliminated. Heating was continued and the operation completed by boiling under reflux for about twenty minutes. The whole operation took about one and a half hours, and the hydrolysable chlorine content fell to below 1% of the original chlorine content.

The organo-polysiloxanes formed were washed with water to remove residual chlorine, and the solvent was then distilled off under vacuum.

There were obtained 115 grams of a slowly-polymerizing phenyl methyl resin, soluble in xylene. On evaporating a xylene solution thereof and heating to between 100 and 250° C., a glossy film was obtained of good resistance to heat.

Example II

Into a flask of the type described in Example I, similarly fitted but also provided with a dropping funnel having a stopcock, there were introduced 67.5 grams of a mixture of dimethyldichlorosilane and monomethyltrichlorosilane, the $CH_3/Si$ ratio of the mixture being 1.70. The mixture was diluted with 500 cc. of anhydrous toluene.

The diluted mixture was boiled under reflux and there were added to it drop by drop 122 grams of diphenylsilane-diol dissolved in toluene containing 20% of dioxane. An immediate and continual evolution of hydrogen chloride took place.

Heating under reflux was continued for thirty minutes after all of the diol had been added, and the product was then allowed to cool. The hydrolysable chlorine content was found to be less than ½% of the original chlorine content of the chlorosilanes.

About a teaspoon-full of powdered anhydrous sodium carbonate was added to neutralize the remaining acid, the mixture was filtered and the solvents were removed by distillation under vacuum.

There were obtained 120 grams of a very viscous resin which on dissolving in a suitable solvent gave a rapidly polymerizing varnish.

Example III

Into a flask of the type described in Example I, fitted as described in Example II, there were introduced 65 grams of dimethyldichlorosilane which had been distilled between 68° and 72° C. This was diluted with 500 cc. of toluene. The mixture was boiled under reflux and a solution of 122 grams of benzylsilane-diol in a mixture of equal parts of dioxane and toluene was added drop by drop. The liberation of hydrogen chloride took place regularly. After the dibenzylsilane-diol had all been added, heating was continued under reflux for one hour, whereupon the residual chlorine content was found to be less than 1% of the original chlorine content.

The acidity was removed by the addition of several drops of N/10 sodium hydroxide solution, the product was washed with water, and the solvent was removed under vacuum.

A rather dark and viscous resin was obtained in a quantity of 128 grams, which could, for example, be used in a varnish for the protection of metals.

Example IV

This example illustrates a method of carrying out the reaction in the absence of a solvent until the final stage.

Into a 250 cc. four-necked flask there were introduced 119 grams of solid diphenylsilane-diol, the flask being fitted with a stirrer, a thermometer, a condenser and a dropping funnel, and being connected with absorbers containing sodium hydroxide solution. A mixture of 103 grams of dimethyldichlorosilane and 44.5 grams of monomethyltrichlorosilane was run in with continuous stirring.

The diphenylsilane-diol reacted slowly, and a regular evolution of hydrogen chloride began, the reaction mixture remaining at about atmospheric temperature. It was apparent after about two hours that the mixture had been converted into a viscous homogeneous resin. After four hours the evolution of hydrogen chloride had become much slower, and it was found on analysis that at least 80% of the chlorine of the chlorosilanes had been eliminated.

The mass having become very viscous, the reaction was completed by adding 50 cc. of dry toluene and heating under reflux for about 15 minutes, whereupon the chlorine content was found to be not more than 7% of the initial value. The product was washed with water in order to remove residual chlorine remaining in the form of chlorosilanes and also hydrogen chloride, and the solvent was evaporated under vacuum.

There were obtained 120 grams of a slowly polymerizing resin of a straw-yellow color, capable of giving after heating at 250° C. a relatively soft homogeneous and brilliant film.

Example V

This example is for a process in which a mixture of silanols was used (diphenylsilane-diol and monophenylsilane-triol) and the initial silanols were not isolated prior to the reaction.

A mixture of 1000 grams of crushed ice, 500 cc. of distilled water and 500 cc. of toluene was placed in a three-liter flask, and the following mixture was added drop by drop from a sufficiently large dropping funnel, the mass in the flask being vigorously stirred by mechanical means:

126 grams of diphenyldichlorosilane
25.4 grams of monophenyltrichlorosilane
150 cc. of toluene
150 cc. of dioxane The hydrolysis of the chlorosilanes was continued for about one hour after which the water was decanted and the precipitate of phenyl silanols formed was dissolved by the addition of about 700 cc. of ethyl ether. The solution was washed several times with water and dried over calcium chloride at a temperature of 0° C. for twenty-four hours.

The solution was then introduced into a two-liter flask provided with a reflux condenser, 65 grams of dimethyldichlorosilane and 18 grams of monomethyltrichlorosilane were added, and the mixture was heated under reflux for one hour. The reflux condenser was then replaced by a small distillation column, and the greater part of the ethyl ether was slowly removed, the temperature of the solution reaching 60° to 70° C. The reflux condenser was introduced and the slow heating continued. Hydrogen chloride was evolved continuously.

When the temperature of the solution had reached about 90° C. the chlorine content was found to be no more than 9% of the original value. The product was then washed with water or treated with sodium bicarbonate, and filtered, and the solvent was eliminated by vacuum distillation.

The product consisted of 124 grams of a rather hard viscous resin of yellow color having the properties of a good varnish.

While there is described above the principles of this invention in connection with specific examples, it is to be clearly understood that this description is made only by way of example and not as a limitation to the scope of this invention.

What is claimed is:

1. A process for producing polymerized organic silicon compounds comprising: reacting in an anhydrous mixture an organo-polyhalo-silane with (1) a substantially stable organo-polyhydroxy-silane, selected from the group consisting of polyhydroxy-silane monomers and (2) lower molecular weight polyhydroxy-silane polymers, the number of halogen atoms in the reactants being substantially equal to the number of hydroxy radicals, and said organo radicals being selected from the group consisting of alkyl, aryl, and alicyclic hydrocarbon radicals containing between one and ten carbon atoms, said reaction liberating hydrogen halide, and polymerizing the resulting product to form a substantially uniform polymerizable polymer in which at least two silicon atoms are connected by an oxygen atom.

2. The process of claim 1 wherein said halo atom is chlorine.

3. The process of claim 1 wherein the ratio of organo radicals to the number of silicon atoms in the reactant mixture is between one to one and three to one.

4. The process of claim 1 wherein said organo-halo-silane comprises a methyl-halo-silane.

5. The process of claim 1 wherein said organo-silanol comprises an aryl-silanol.

6. The process of claim 5 wherein said aryl-silanol comprises a phenyl silane-diol.

7. The process of claim 5 wherein said aryl silanol comprises a benzyl silane-diol.

8. The process of claim 1 wherein said reaction is completely carried out at a temperature below about 120° C.

9. A process according to claim 1 wherein said reaction is carried out in the absence of a catalyst.

10. A process according to claim 1 wherein said reaction is carried out in the presence of an inert solvent.

11. A process according to claim 10 wherein said organo-polyhydroxy-silane is obtained from extracting a reaction mixture of a hydrolized corresponding organo-polyhalo-silane with said inert solvent.

12. A process according to claim 1 including hydrolizing organo-polyhalo-silane with water to produce a corresponding organo-polyhydroxy-silane by extraction with an inert solvent to produce said anhydrous mixture containing said organo-polyhydroxy-silane.

13. A process according to claim 1 wherein said lower molecular weight polyhydroxy-silane polymers are lower than pentomers.

References Cited in the file of this patent

UNITED STATES PATENTS

| Number | Name | Date |
|---|---|---|
| 2,469,890 | Patnode | May 10, 1949 |
| 2,486,162 | Hyde | Oct. 25, 1949 |

OTHER REFERENCES

Rochow: "An Introduction to the Chemistry of the Silicones" (1946), pages 35, 64–67.